UNITED STATES PATENT OFFICE.

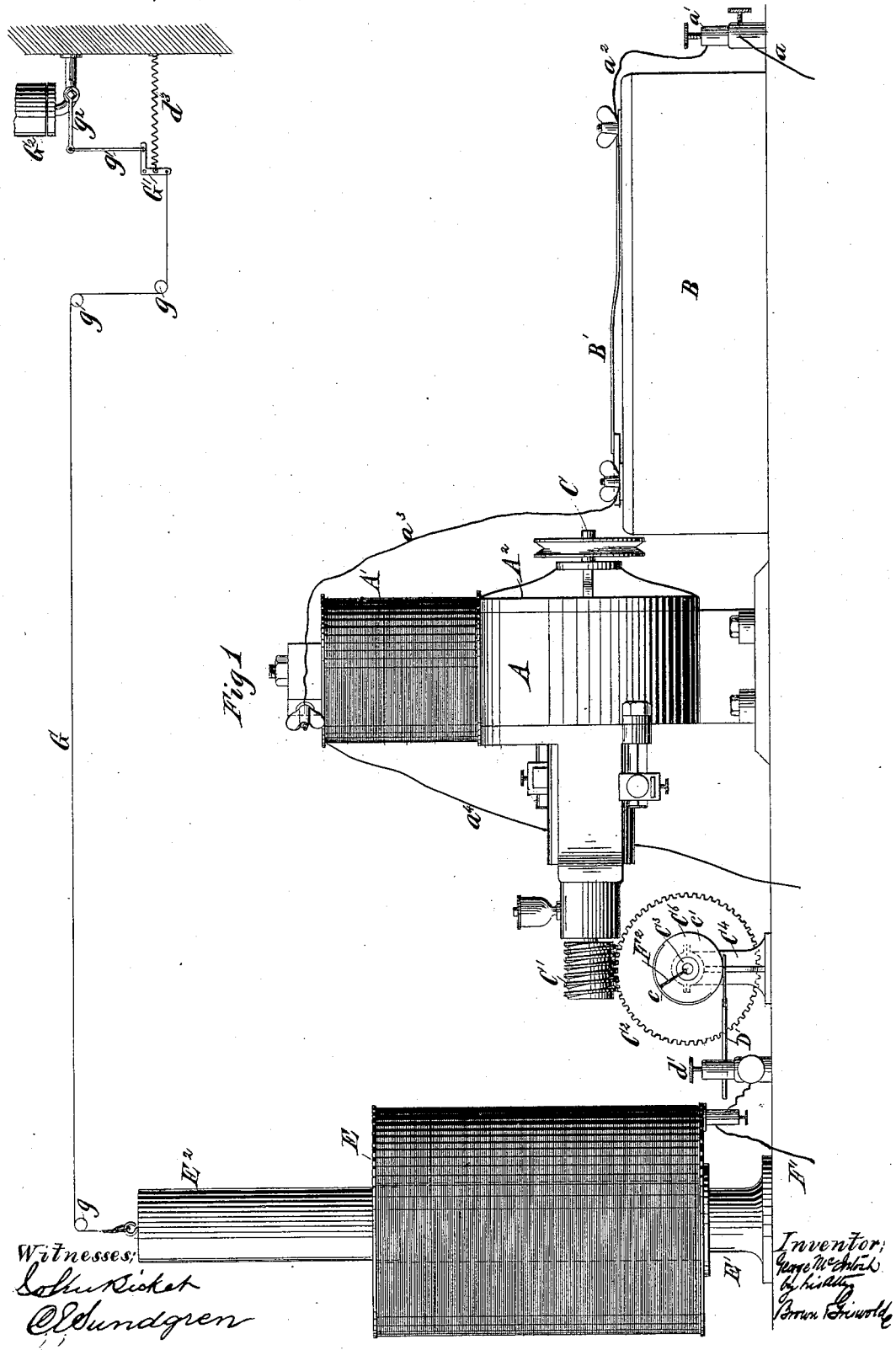

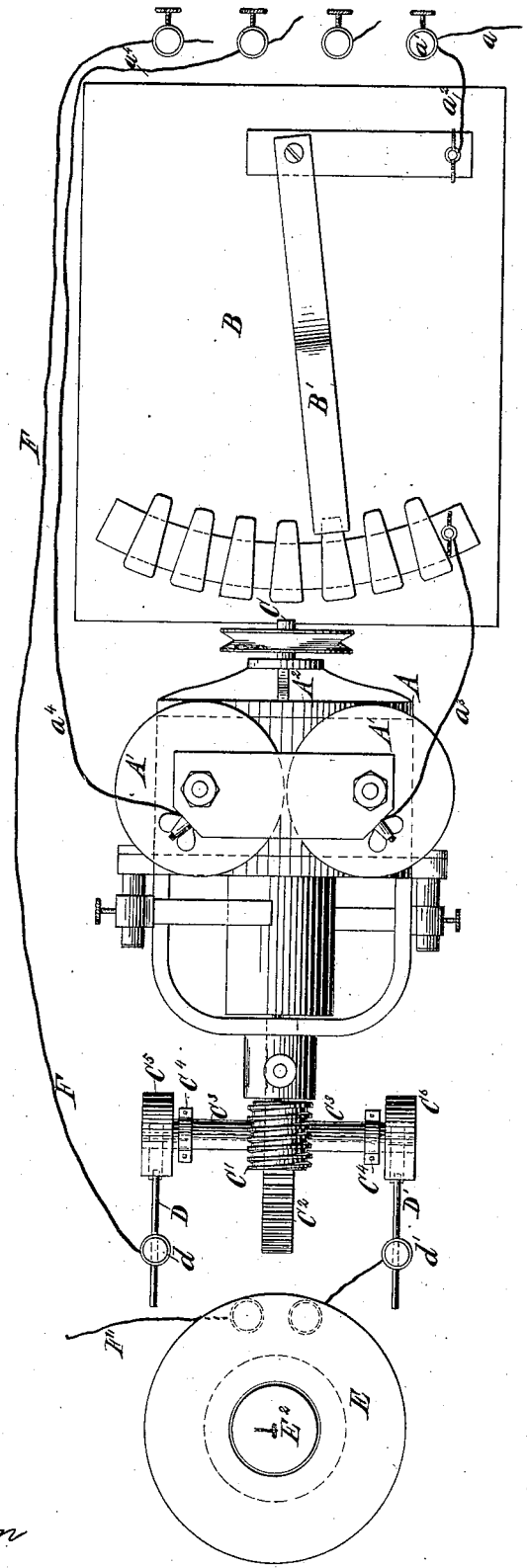

GEORGE McINTOSH, OF STONINGTON, CONNECTICUT.

ELECTRIC SIGNAL.

SPECIFICATION forming part of Letters Patent No. 407,490, dated July 23, 1889.

Application filed April 20, 1889. Serial No. 307,974. (No model.)

*To all whom it may concern:*

Be it known that I, GEORGE MCINTOSH, of the city of Stonington, in the county of New London and State of Connecticut, have invented a certain new and useful Improvement in Electric Signals, of which the following is a specification.

My improvement relates to apparatus for automatically giving an audible signal upon a steamboat or steamship during fog, or whenever from any cause it will be necessary to give such signal at stated intervals.

In the accompanying drawings, Figure 1 is a side elevation of apparatus adapted to carry out my improvement. Fig. 2 is a plan or top view of the same.

Similar letters of reference designate corresponding parts in both the figures.

In carrying out my invention I employ a dynamo or other suitable source of electricity, which, however, I have not illustrated, as it does not form part of my invention, broadly considered. If a dynamo is the source of electricity, it may be the same as that employed for electric lighting on a steamboat or ship. In the dynamo-circuit I arrange in the example of my improvement shown an electric motor A, which may be of any approved kind. I have shown one comprising field-magnets A', arranged above an armature $A^2$. Preferably I arrange in the circuit a series of resistances, which may be of ordinary construction, and are contained, as here shown, in a case B. By operating a switch B' any desired resistance may be thrown into or out of the circuit in a well-known manner. A line-wire $a$ from the source of electricity connects with a binding-post $a'$, and from thence a wire $a^2$ passes to the resistance. From the resistance a wire $a^3$ passes to one of the magnets of the motor. To the other magnet of the motor a wire $a^4$ leads from the other pole of the source of electricity.

Upon an armature-shaft C is mounted a worm C', engaging a worm-wheel $C^2$, mounted upon a shaft $C^3$, journaled in suitable bearings on standards $C^4$, which may be secured upon any suitable support. In the example of my improvement shown the shaft $C^3$ is hollow. Upon one end of the shaft $C^3$ is a metallic contact-piece $C^5$, shown as in the form of a wheel, and upon the other end of the shaft $C^3$ is a commutator-wheel $C^6$, provided in the present example with a metallic contact-piece $c$ and an insulated portion $c'$. The metallic contact-piece $c$ extends circumferentially about the commutator and for about one-half the circumference thereof; but any desired number of contact-pieces may be arranged on the commutator in any desired order.

D designates a brush leading from a binding-post $d$ and bearing upon the contact-piece $C^5$.

D' designates a brush leading from a binding-post $d'$ and bearing upon the periphery of the commutator $C^6$.

E designates an electro-magnet or helix, which may be of ordinary construction, and, as here shown, is supported vertically upon a standard E'.

$E^2$ designates a loose iron core for the magnet E. Normally, or when the magnet E is de-energized, the core $E^2$ is held up in the position shown in Fig. 1; but when the magnet is energized the core $E^2$ will be drawn down suddenly in the magnet. When so drawn down, it will operate through suitable mechanism to blow a whistle, cause the ringing of a bell, or operate any other audible signal. Circuit is closed on the magnet by means of the commutator $C^6$, in this instance once during each revolution of the commutator. The commutator and electro-magnet circuit comprise line-wires F F', the former leading from a source of electricity (not shown) to the binding-post D, and the latter leading from the electro-magnet back to the source of electricity. It also comprises in this instance a wire $F^2$, leading from the contact-piece $C^5$, through the hollow shaft $C^3$, to the metallic strip $c$ of the commutator.

I have illustrated diagrammatically a means by which a whistle may be blown, consisting of a cord G, passing over pulleys $g$, and connected at one end to one arm of a bell-crank lever G', the other arm of which is connected by a cord $g'$ with a lever $g^2$ for operating a steam-whistle $G^2$. The motor having been set in operation, the commutator will be rotated very regularly and at stated intervals. The commutator-strip $c$ will close circuit on the electro-magnet, causing the core $E^2$ to be drawn inwardly, whereby the whistle will be caused to blow, or the operation of any other signal employed be effected. The blowing of the whistle or operation of the signal will continue as long as the commutator-strip is in contact with the brush D, and of course will cease when such strip is no longer in contact with the brush. A spring $d^3$, acting on the bell-crank lever G', will then operate to raise the core $E^2$ to its normal position. The core is of course drawn downwardly against the resistance of said spring.

Of course the mechanical details of my improvement may be very much varied, and I do not wish to limit myself strictly to such as are shown, the essential features of the invention being the use of a motor in conjunction with an electro-magnet and commutator for the purpose of causing the operation of a signal at stated intervals.

What I claim as my invention, and desire to secure by Letters Patent, is—

The combination, with an electric motor, of a commutator-wheel continuously rotated thereby when the motor is in motion, and provided upon its periphery with a metallic and a non-metallic surface, a helix, a brush bearing upon said commutator-wheel and in electrical circuit with said helix and commutator-wheel, a movable core for said helix moved in one direction when said helix is energized through the commutator-wheel and in the other direction by a spring when said helix is de-energized by the commutator-wheel, and a signal connected with said movable core and operated when said core is moved by the energizing of the helix, substantially as specified.

GEORGE McINTOSH.

Witnesses:
FREDK. HAYNES,
GEO. BARRY.